United States Patent
Hara

(10) Patent No.: US 7,992,941 B2
(45) Date of Patent: Aug. 9, 2011

(54) ARMREST ATTACHING STRUCTURES

(75) Inventor: Yoshiro Hara, Ichinomiya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 107 days.

(21) Appl. No.: 12/326,245

(22) Filed: Dec. 2, 2008

(65) Prior Publication Data

US 2009/0148226 A1    Jun. 11, 2009

(30) Foreign Application Priority Data

Dec. 6, 2007   (JP) ................................ 2007-315778

(51) Int. Cl.
*A47B 97/00* (2006.01)

(52) U.S. Cl. ............... 297/463.1; 297/463.2; 297/411.2; 297/411.32; 297/411.45

(58) Field of Classification Search ............... 297/463.1, 297/463.2, 411.2, 411.32, 411.45
See application file for complete search history.

(56) References Cited

U.S. PATENT DOCUMENTS

| | | | | |
|---|---|---|---|---|
| 4,097,088 A * | 6/1978 | Meiller | ..................... | 297/411.38 |
| 4,400,033 A * | 8/1983 | Pietsch | ..................... | 297/411.39 |
| 5,292,171 A * | 3/1994 | Harrell | ........................... | 297/113 |
| 5,823,624 A * | 10/1998 | Dahlbacka | ............... | 297/411.36 |
| 6,328,384 B1 * | 12/2001 | Yamauchi et al. | ........ | 297/411.29 |
| 6,371,560 B1 * | 4/2002 | Fulford et al. | ............ | 297/411.27 |
| 6,499,807 B1 * | 12/2002 | Kaneda et al. | ........... | 297/452.52 |
| 6,619,747 B2 * | 9/2003 | Ko et al. | ................... | 297/423.12 |
| 6,672,670 B2 * | 1/2004 | Funk et al. | ............... | 297/411.32 |
| 6,883,871 B2 * | 4/2005 | Nae et al. | ................. | 297/411.32 |

FOREIGN PATENT DOCUMENTS

JP    2007-558 A    1/2007

OTHER PUBLICATIONS

English language Abstract and translation JP 2007-558 A.

\* cited by examiner

*Primary Examiner* — Laurie K Cranmer
(74) *Attorney, Agent, or Firm* — Greenblum & Bernstein, P.L.C.

(57) ABSTRACT

An armrest attaching structure for attaching an armrest to a vehicle seat having a seat back frame, the seat back frame having a side frame element that is connected to a base member at a lower end portion thereof, may include an armrest attachment member having an armrest attaching portion and a connecting portion. The armrest attaching portion is connected to the armrest. The connecting portion is connected to the side frame element of the seat back frame at a position closer to the lower end portion of the side frame element than the armrest attaching portion.

5 Claims, 4 Drawing Sheets

US 7,992,941 B2

ARMREST ATTACHING STRUCTURES

This application claims priority to Japanese patent application serial number 2007-315778, the contents of which are incorporated herein by reference.

BACKGROUND OF THE INVENTION

1. Field of the Invention

The present invention relates to armrest attaching structures for attaching armrests to vehicle seats. More particularly, the present invention relates to armrest attaching structures for attaching armrests to seat backs of vehicle seats.

2. Description of Related Art

A vehicle seat having an armrest that is attached to a side portion of a seat back is already known. In the vehicle seat, the armrest is attached to a side frame element of a seat back frame via a bracket. In particular, the bracket is fixedly attached to the side frame element of the seat back frame by welding. The armrest is tiltably (rotatably) connected to the bracket via hinge connection. Such a vehicle seat is taught, for example, by Japanese Laid-Open Patent Publication Number 2007-558.

However, in this structure, both of upper and lower portions of the bracket are welded to the side frame element of the seat back frame, so that the bracket is connected thereto. This means that the bracket is supported on the side frame element of the seat back frame at a relatively higher level. As a result, the armrest connected to the bracket is supported on the side frame element of the seat back frame at the relatively higher level. Therefore, when a rotational force (load) is applied to the bracket via the armrest, the force can be transmitted to the side frame element of the seat back frame at the relatively higher level. As a result, a large bending moment can be produced at a lower end portion of the side frame element of the seat back frame. The lower end portion is rotatably connected to a seat cushion frame of a seat cushion via a reclining mechanism. Thus, a large load can be applied to the side frame element of the seat back frame.

BRIEF SUMMARY OF THE INVENTION

For example, in one aspect of the present invention, an armrest attaching structure for attaching an armrest to a vehicle seat having a seat back frame may include an armrest attachment member having an armrest attaching portion and a connecting portion. The seat back frame has a side frame element that is connected to a base member at a lower end portion thereof. The armrest attaching portion is connected to the armrest. The connecting portion is connected to the side frame element of the seat back frame at a position closer to the lower end portion of the side frame element than the armrest attaching portion.

According to the armrest attaching structure, when a force (load) is applied to the armrest attachment member (the armrest attaching portion) via the armrest, the force can be transmitted to the side frame element via the connecting portion. However, the connecting portion is positioned closer to the lower end portion of the side frame element than the armrest attaching portion. Therefore, the force can be transmitted to the side frame element at a relatively lower level. As a result, a bending moment produced at the lower end portion of the side frame element can be effectively reduced. Thus, a load applied to the side frame element can be reduced.

Other objects, features and advantages of the present invention will be readily understood after reading the following detailed description together with the accompanying drawings and the claims.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

A detailed representative embodiment of the present invention will be described with reference FIGS. 1 to 4.

Figure 1:
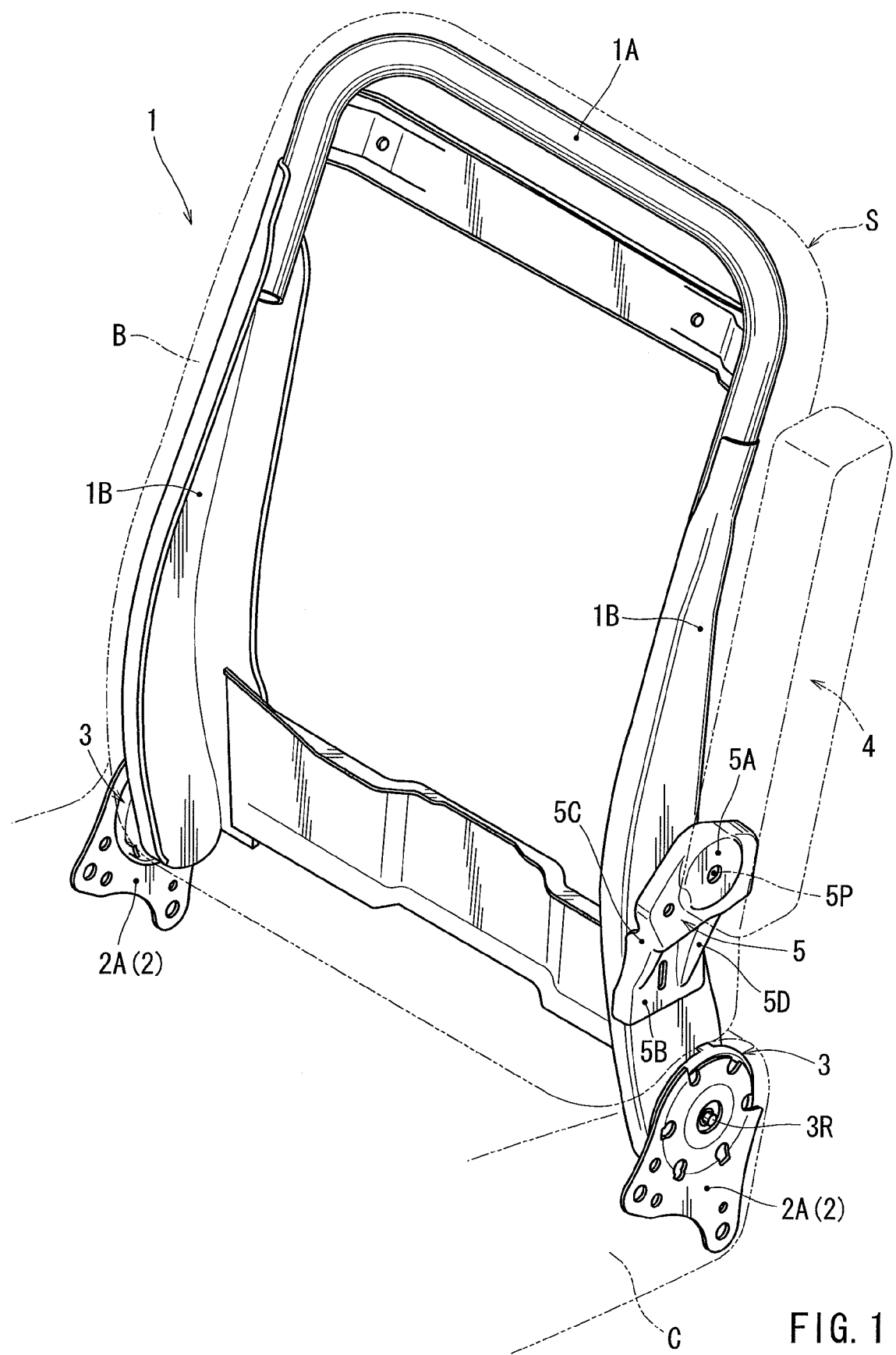
FIG. 1 is a perspective view of a seat back frame, which schematically illustrates an armrest attaching structure according to a representative embodiment of the present invention.

As shown in FIG. 1, a vehicle seat S may preferably include a seat back B and a seat cushion C. The vehicle seat S may preferably include a seat back frame 1 corresponding to the seat back B and a seat cushion frame 2 (a base member) corresponding to seat cushion C. The seat back frame 1 may preferably be composed of an upper frame element 1A and a pair of side frame elements 1B. Lower end portions of the side frame elements 1B are respectively rotatably connected to side frame elements 2A of the seat cushion frame 2 via seat reclining devices 3, so that the seat back B (the seat back frame 1) can be rotated about a common rotational axis R of the seat reclining devices 3. Therefore, a tilting angle of the seat back B (the seat back frame 1) relative to the seat cushion C (the seat cushion frame 2) can be adjusted by operating the seat reclining devices 3 (i.e., by switching the seat reclining devices 3 between a locked condition and an unlocked condition). The seat reclining devices 3 can be changed between the locked condition and the unlocked condition by simply operating an operation lever (not shown) that is attached to a side portion of the seat cushion C.

As will be apparent from FIG. 1, the upper frame element 1A of the seat back frame 1 may preferably be formed by bending a tubular steel member to a substantially U-shape. Conversely, each of the side frame elements 1B of the seat back frame 1 may preferably be formed by shaping (folding) an elongated plate-shaped steel member to a substantially curved gutter shape. Upper end portions of the side frame elements 1B are respectively connected to (integrated with) bent end portions of the upper frame element 1A by welding. Thus, the seat back frame 1 is formed.

Figure 2:
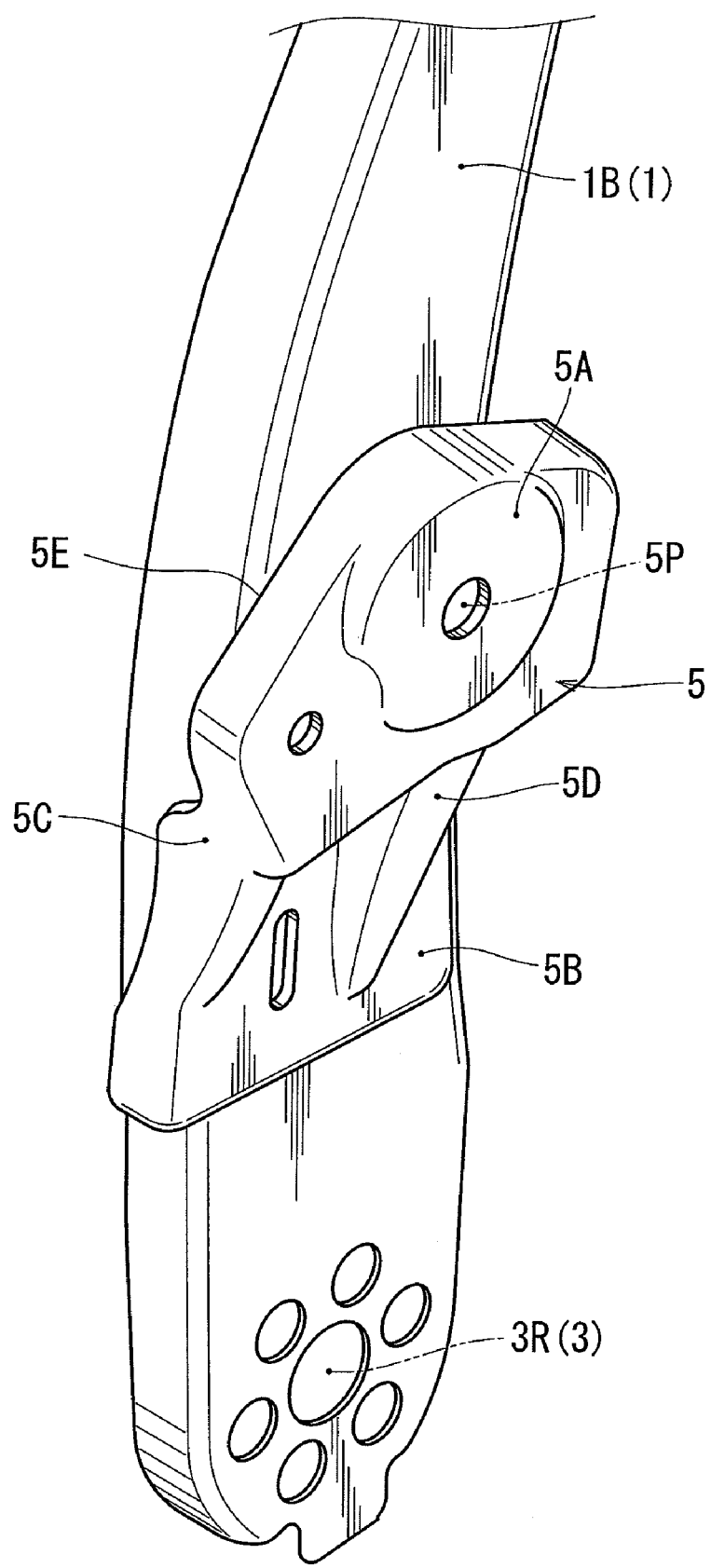
FIG. 2 is a partially enlarged view of FIG. 1.
Figure 3:
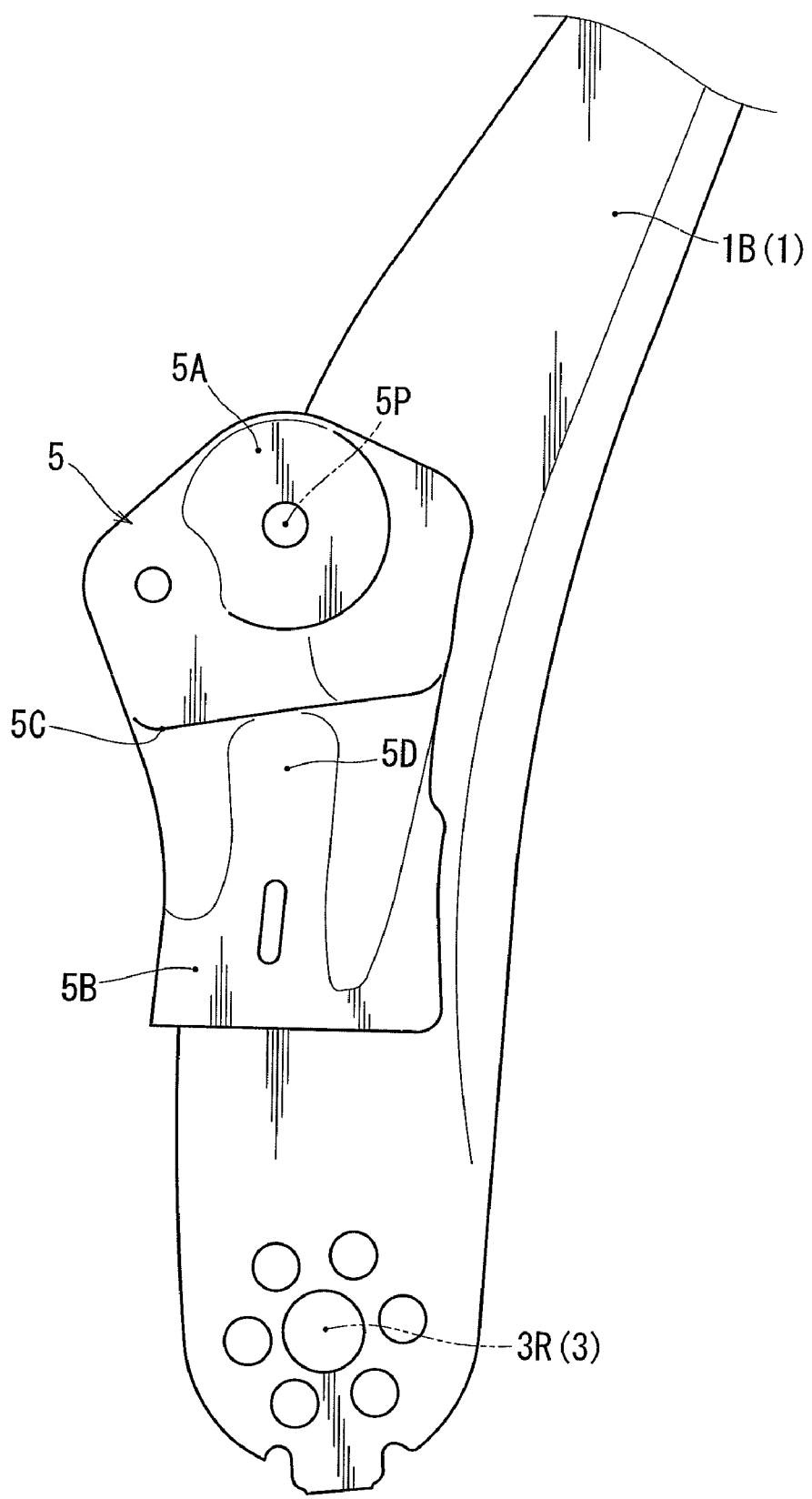
FIG. 3 is a side view of FIG. 2.
Figure 4:
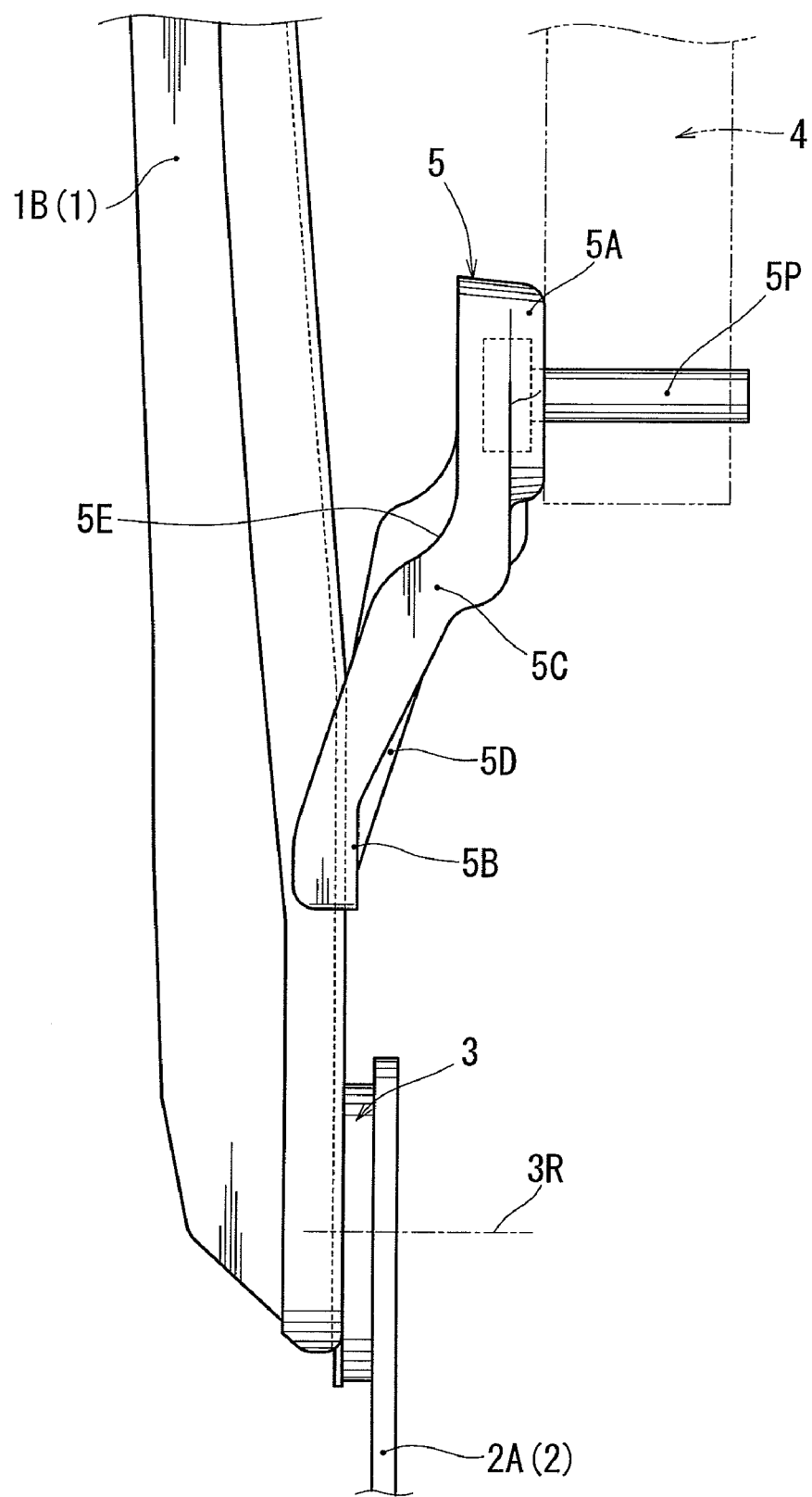
FIG. 4 is an elevational view of FIG. 2.

As shown in FIG. 1, a bracket 5 (an armrest attachment member) is vertically attached to an outer surface of one of the side frame elements 1B (the right side frame element 1B) in order to attach an armrest 4 to the seat back frame 1 (the seat back B). In particular, as best shown in FIG. 4, the bracket 5 may preferably be formed by folding a steel plate to a substantially crank shape. That is, the bracket 5 may preferably be formed so as to have an upper portion 5A (an armrest attaching portion), a lower portion 5B (a connecting portion), and an inclined intermediate (middle) portion 5C (a folded or angled transient portion) that is positioned between the upper and lower portions 5A and 5B and connects the upper and lower portions 5A and 5B. The upper portion 5A may preferably be constructed to be connected to the armrest 4. The lower portion 5B may preferably be constructed to be connected to the right side frame element 1B. Also, the lower portion 5B may preferably be shaped and constructed such that the bracket S is cantilevered when the lower portion 5B is connected to the right side frame element 1B. The intermediate portion 5C may preferably be angled so that the upper portion 5A is offset from the lower portion 5B. Further, the bracket S may preferably be shaped such that a reinforcement rib portion 5D can be formed in the intermediate portion 5C. As best shown in FIG. 3, the rib portion 5D may preferably be formed to extend between the upper and lower portions 5A and 5B. In addition, as best shown in FIG. 2, the bracket 5 may preferably be shaped so as to have a rim portion 5E that extends along a periphery thereof. Thus, the bracket 5 may have an increased rigidity (a resistance to bending or twisting).

As best shown in FIGS. 1 and 4, the bracket 5 thus formed is vertically disposed on the outer surface of the right side frame elements 1B while the lower portion 5B is positioned closer to the reclining device 3 than the upper portion 5A (while the lower portion 5B is positioned at a desired distance above the reclining device 3). Further, as shown in FIG. 4, the bracket S is positioned such that the upper portion 5A can substantially be vertically aligned while the upper portion 5A is (laterally) spaced away from the outer surface of the right side frame elements 1B. The lower portion 5B thus positioned is connected to (integrated with) the outer surface of the right side frame element 1B by welding. Thus, the bracket 5 can be attached thereto.

As shown in FIGS. 1 and 4, the armrest 4 is rotatably connected to the upper portion 5A of the bracket 5 via a connecting shaft 5P. The armrest 4 is capable of rotating relative to the bracket 5 between a retracted (vertical) position (which corresponds to a position shown in FIGS. 1 and 4) and a use (horizontal) position (not shown).

Thus, in this embodiment, in order to attach the bracket 5 to the right side frame element 1B, only the lower portion 5B of the bracket 5 is connected to the right side frame element 1B by welding at a position closer to the reclining device 3 than the upper portion 5A (i.e., at a position closer to the lower end portion of the right side frame element 1B than the upper portion 5A). That is, the upper portion 5A of the bracket 5 is not connected to the right side frame element 1B. This means that the bracket 5 can be supported on the right side frame element 1B at a relatively lower level (i.e., at a position closer to the reclining device 3). As a result, the armrest 4 connected to the bracket 5 (the upper portion 5A) can be supported on the right side frame element 1B at the relatively lower level. Therefore, when a rotational force (load) is applied to the bracket 5 (the upper portion 5A) via the armrest 4, the force can be transmitted to the right side frame element 1B at the relatively lower level because the force can be transmitted thereto via only the lower portion 5B that is positioned closer to the reclining device 3 than the upper portion 5A.

As a result, only a limited bending moment can be produced at the lower end portion of the right side frame elements 1B of the seat back frame 1 (i.e., about the seat reclining device 3). Thus, only a limited load can be applied to the right side frame elements 1B of the seat back frame 1.

As will be appreciated, if both of the upper and lower portions 5A and 5B of the bracket 5 are connected to the right side frame element 1B, the bracket 5 can be supported on the right side frame element 1B at a relatively higher level (i.e., at a position upwardly spaced away from the reclining device 3). As a result, the armrest 4 connected to the bracket 5 can be supported on the right side frame element 1B at the relatively higher level. Therefore, when the rotational force (load) is applied to the bracket 5 (the upper portion 5A) via the armrest 4, the force can be transmitted to the right side frame element 1B at the relatively higher level because the force can be transmitted thereto via both of the upper and lower portions 5A and 5B.

In such a case, a large bending moment can be produced at the lower end portion of the right side frame elements 1B of the seat back frame 1 (i.e., about the seat reclining device 3). Thus, a considerable load can be applied to the right side frame elements 1B of the seat back frame 1.

As described above, the bracket 5 is supported on the right side frame element 1B by only the lower portion 5B thereof. That is, the bracket 5 is supported on the right side frame element 1B in a cantilevered position (while being cantilevered). However, the bracket 5 may preferably be reinforced by the reinforcement rib portion 5D and the rim portion 5E formed therein, so as to have the increased rigidity (the resistance to bending or twisting). Therefore, the armrest 4 can be reliably supported on the right side frame element 1B by the bracket 5.

Naturally, various changes and modifications may be made to the present invention without departing from the scope of the invention. For example, in the embodiment, the bracket 5 has the crank shape. That is, the upper portion 5A is connected to the lower portion 5B via the inclined intermediate portion 5C. However, the upper portion 5A can be connected to the lower portion 5B via a liner or curved intermediate portion (not shown).

Further, in the embodiment, the armrest 4 is rotatably connected to the upper portion 5A of the bracket 5 via a connecting shaft 5P. However, the armrest 4 can be fixedly (unrotatably) connected to the upper portion 5A of the bracket 5, if necessary.

Further, in the embodiment, the bracket 5 is attached the seat back frame 1 that is connected to the seat cushion frame 2 via the seat reclining devices 3. However, the bracket 5 can be attached to a seat back frame (not shown) that is connected to a support member (not shown) such a vehicle floor.

Further, in the embodiment, the bracket 5 is attached the seat back frame 1 that is connected to the seat cushion frame 2 via the seat reclining devices 3. However, the bracket 5 can be attached to the seat back frame 1 that is rigidly connected to the seat cushion frame 2 via fastening devices such as volts and rivets (not shown).

What is claimed is:

1. An armrest attaching structure for attaching an armrest to a vehicle seat having a seat back frame and a seat cushion frame, the seat back frame having a side frame element that is connected to the seat cushion frame at a lower end portion thereof via a reclining mechanism, the armrest attaching structure comprising:
   an armrest attachment member having an armrest attaching portion and a connecting portion,
   wherein the armrest attaching portion is connected to the armrest, wherein the armrest attaching portion is spaced from the side frame element and connected to the side frame element only through the connecting portion, wherein the connecting portion is connected to the side frame element of the seat back frame only at a position closer to the lower end portion of the side frame element than the armrest attaching portion, and wherein the armrest attachment member is attached to the side frame element such that the seat back frame rotates relative to the seat cushion frame.

2. The armrest attaching structure as defined in claim 1, wherein the armrest attaching portion is connected to the connecting portion via a transient portion.

3. The armrest attaching structure as defined in claim 2, wherein the transient portion is angled so that the armrest attaching portion is offset from the connecting portion.

4. The armrest attaching structure as defined in claim 2, wherein a reinforcement rib portion is formed in the transient portion.

5. The armrest attaching structure as defined in claim 1, wherein the connecting portion is connected to the side frame element of the seat back frame such that the armrest attachment member can be cantilevered.

\* \* \* \* \*